United States Patent
Rinklin

(10) Patent No.: US 7,111,898 B2
(45) Date of Patent: Sep. 26, 2006

(54) MOTOR VEHICLE WITH AIR GUIDING MEANS AND METHOD OF MAKING THE SAME

(75) Inventor: Gerhard Rinklin, Tiefenbronn (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 11/029,466

(22) Filed: Jan. 6, 2005

(65) Prior Publication Data

US 2005/0168013 A1 Aug. 4, 2005

(30) Foreign Application Priority Data

Jan. 29, 2004 (DE) ................ 10 2004 004 360

(51) Int. Cl.
*B60J 1/20* (2006.01)
(52) U.S. Cl. .................................. 296/180.1
(58) Field of Classification Search .. 296/180.1–180.5; 180/903
See application file for complete search history.

(56) References Cited

U.S. PATENT DOCUMENTS

| | | | | |
|---|---|---|---|---|
| 4,887,681 A | * | 12/1989 | Durm et al. ............... | 180/68.1 |
| 5,141,281 A | * | 8/1992 | Eger et al. ............... | 296/180.5 |
| 6,170,904 B1 | * | 1/2001 | Schaedlich et al. ...... | 296/180.1 |
| 6,382,708 B1 | * | 5/2002 | Erdelitsch et al. ....... | 296/180.5 |
| 2003/0090126 A1 | * | 5/2003 | Adams ..................... | 296/180.1 |
| 2005/0029835 A1 | * | 2/2005 | Adams ..................... | 296/180.1 |
| 2005/0168013 A1 | * | 8/2005 | Rinklin ................... | 296/180.1 |

FOREIGN PATENT DOCUMENTS

| | | |
|---|---|---|
| DE | 2851639 | 6/1980 |
| DE | 44 27 196 A1 | 2/1996 |
| DE | 197 41 321 A1 | 12/1998 |
| EP | 0882642 | 12/1998 |
| FR | 2816905 | 5/2002 |
| JP | 02-006281 | 1/1990 |

OTHER PUBLICATIONS

European Search Report dated Oct. 26, 2005.

* cited by examiner

*Primary Examiner*—H Gutman
(74) *Attorney, Agent, or Firm*—Crowell & Moring LLP

(57) ABSTRACT

A motor vehicle includes a trunk lid having a rear transverse edge, an air guide extending across the width of the vehicle, and a lower rear end panel including a continuation that runs beneath the rear transverse edge of the trunk lid. The air guide adjoins the rear transverse edge of the trunk lid and includes a slotted wing system. The slotted wing system includes a rear wing displaceable between a retracted rest position and a deployed active position and a fixed rear-deck spoiler lying below the rear wing. The continuation has a shallow trough which runs across the vehicle width and which at least partially accommodates the rear wing when the rear wing is in the rest position. The rear-deck spoiler has a hump disposed across the vehicle width on the lower rear end panel

27 Claims, 4 Drawing Sheets

MOTOR VEHICLE WITH AIR GUIDING MEANS AND METHOD OF MAKING THE SAME

BACKGROUND AND SUMMARY OF THE INVENTION

A motor vehicle has a trunk lid, a lower rear end panel, and an air guiding means extending across the width of the vehicle and displaceable by a drive device from a retracted rest position to a deployed active position and vice versa. The air guide means adjoins a rear transverse edge of the trunk lid disposed transversely of the vehicle. The lower rear end panel has an extension running underneath the air guiding means in the direction of the transverse edge.

A motor vehicle is disclosed in DE 44 27 196 A1 which has a trunk lid, a lower rear panel and air guiding means which can be displaced by a power system from a retracted rest position into a deployed, raised, active position and vice versa. The air guiding means extends across the width of the vehicle and is adjoined directly to a rear transverse edge of the trunk lid running in the transverse direction of the vehicle. Underneath the air guiding means extends a continuation which runs from the lower rear panel toward the trunk lid. This continuation ends underneath the air guiding means at a distance from the transverse edge of the trunk lid. The air guiding means itself is constructed in the known motor vehicle as a so-called trailing edge which has a wing-like profile and is formed on the front side with a continuous wall extending across the width of the vehicle. Thus, an air flow guided over the trunk lid is guided over the trailing edge and the top side of the wing.

DE 197 41 321 A1 has furthermore disclosed an air guiding means mounted on a trunk lid of a motor vehicle, which is configured as a so-called "slotted wing" and has a movable rear wing as well as a stationary rear-deck spoiler.

The present invention is concerned with the optimization of the air guiding means of a motor vehicle.

The advantages mainly achieved with the invention are to be seen in the fact that, with the arrangement of a slotted wing, the aerodynamic qualities of the motor vehicle are basically optimized in the rear-deck area in comparison with an air guiding means configured as a trailing edge. By arranging the slotted wing in the area of the lower rear-end panel, the air guiding means, when in its retracted position, does overlap the outer skin in the area of the trunk lid and the lower rear panel, but not as plainly as it does in the prior art in the case of the known slotted wing on the trunk lid. Advantages result, for example, when automatic car washing equipment is used. It is furthermore advantageous that by arranging the air guiding means on the lower rear-end panel the weight of the trunk lid is reduced, making the trunk lid easier to open. Especially in motor vehicles which are equipped with a storage space under the trunk lid this is advantageous, since the user of the vehicle can more easily open the trunk lid due to its lighter weight.

A desirable flow of air on the rear-deck spoiler is achieved, since the oncoming air is guided across the bottom of the trough to the rear-deck spoiler.

A reduction of the rear wing to a very low position is made possible, so that an especially good aerodynamic shape is achieved in the transitional area between the transverse edge of the trunk lid and the rear-deck spoiler.

In an especially preferred embodiment, the bottom of the trough is provided with a supporting structure. Since especially in the active position of the rear spoiler and at higher vehicle speeds, definite forces are acting on the bottom due to the air stream, the supporting structure offers support for these forces provoked by the air flow, so that the bottom of the trough when running at high speed does not vibrate or shake out of control in the air current.

For a simple fastening of the supporting structure, which provides definite advantages as regards assembly, a connection with the features stated in claims 8 and 9 is especially preferred. In further development of the invention, with the features names in claim 10, a secure fastening of the supporting element is achieved.

In order further to optimize the action of the supporting structure, in an embodiment, a support of the supporting structure on the body side is proposed.

In an especially preferred embodiment, with the features stated, the actual function of the lower rear-end panel is expanded if the trough and the rear spoiler are made integral with the lower rear-end panel, and the stiffness of the trough is improved by a further development having the features named in claim 16.

Other objects, advantages and novel features of the present invention will become apparent from the following detailed description of the invention when considered in conjunction with the accompanying drawings.

DETAILED DESCRIPTION OF THE DRAWINGS

Figure 1:
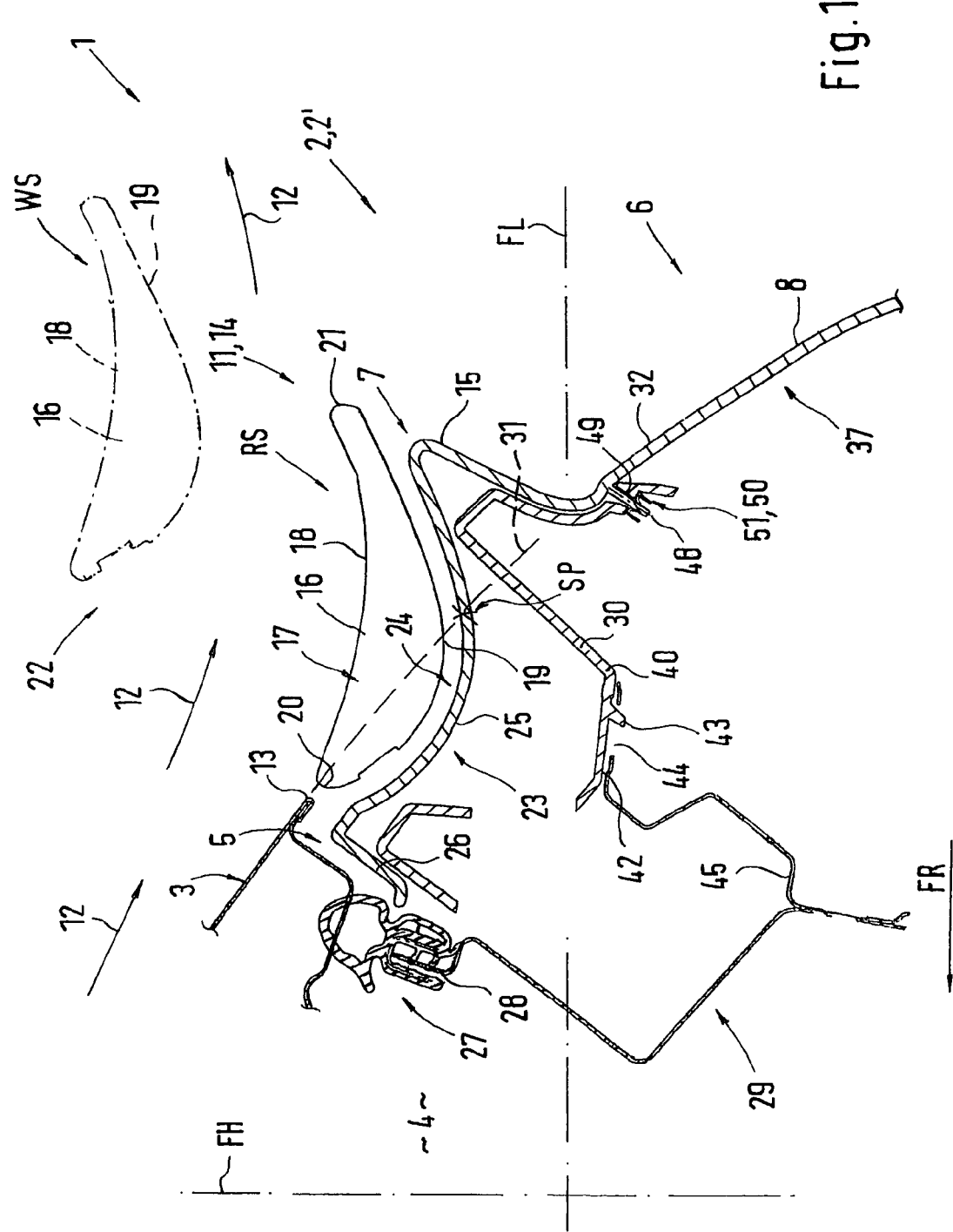
FIG. 1 shows, in part, a motor vehicle having a trunk lid, a lower rear-end panel, and an air guiding means in longitudinal section.
Figure 2:
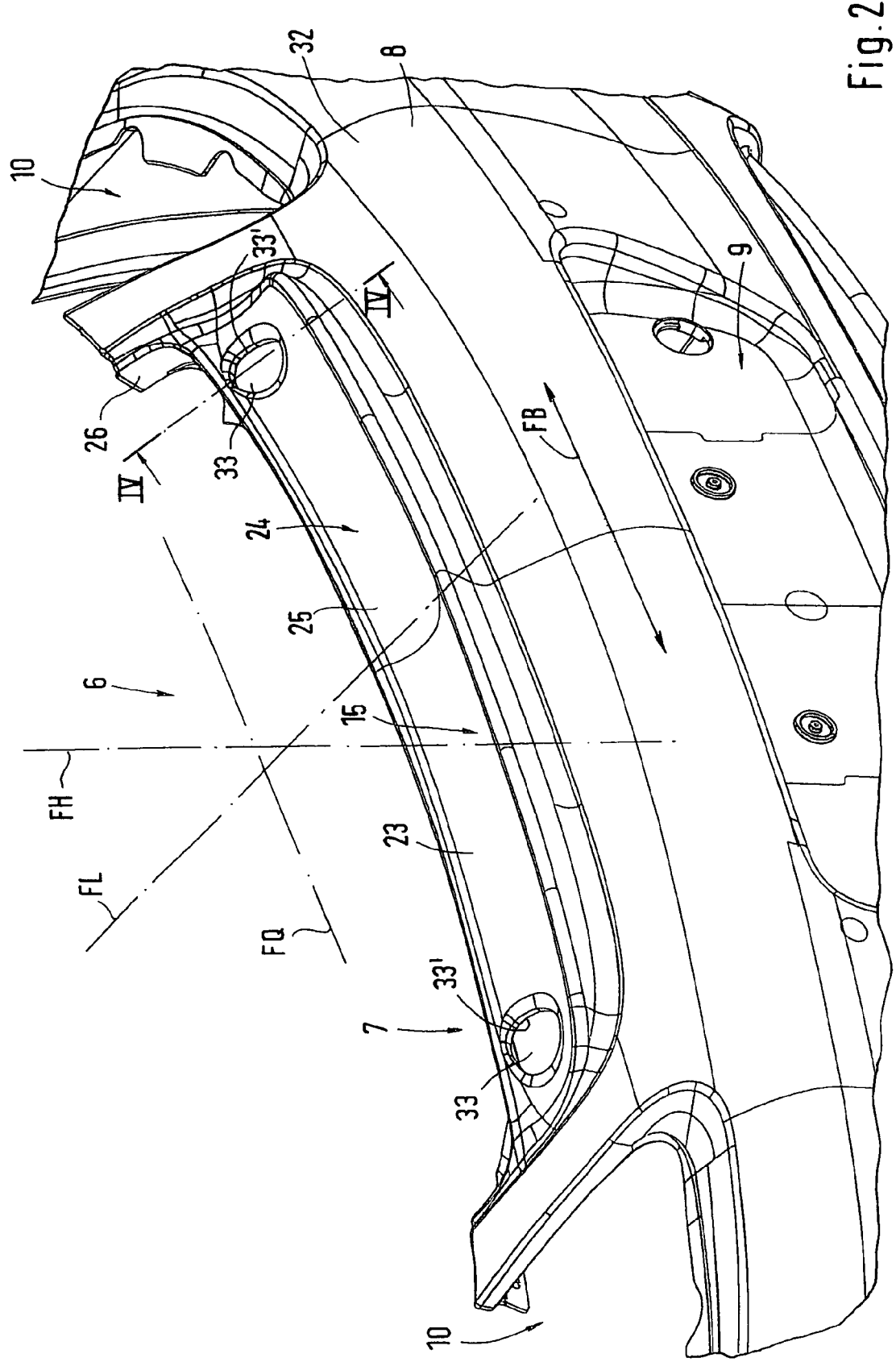
FIG. 2 shows a detail in perspective elevation of the lower rear-end panel with a rear spoiler of the air guiding means.
Figure 3:
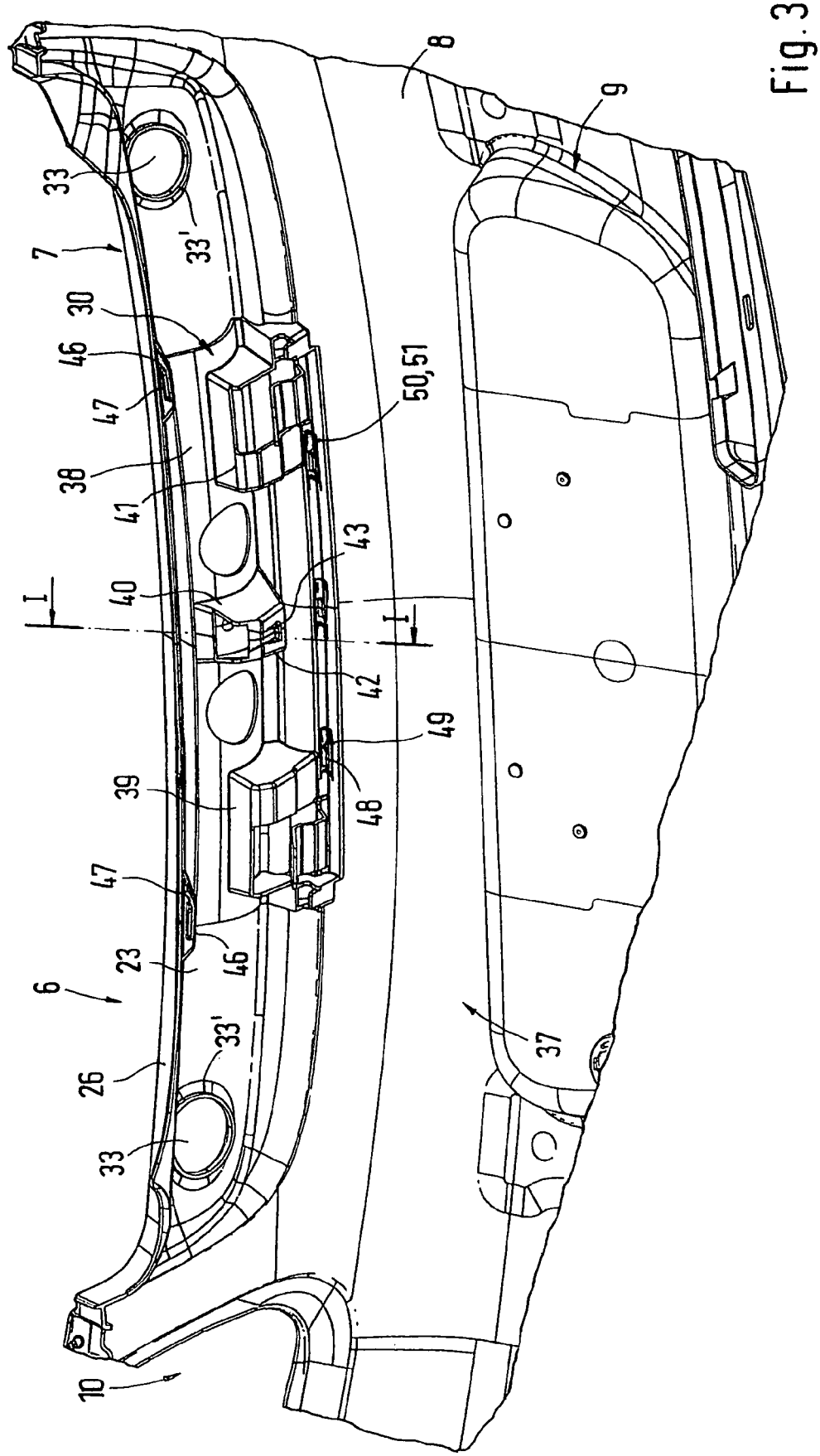
FIG. 3 shows a perspective elevation of the interior side of the lower rear-end panel of FIG. 2.
Figure 4:
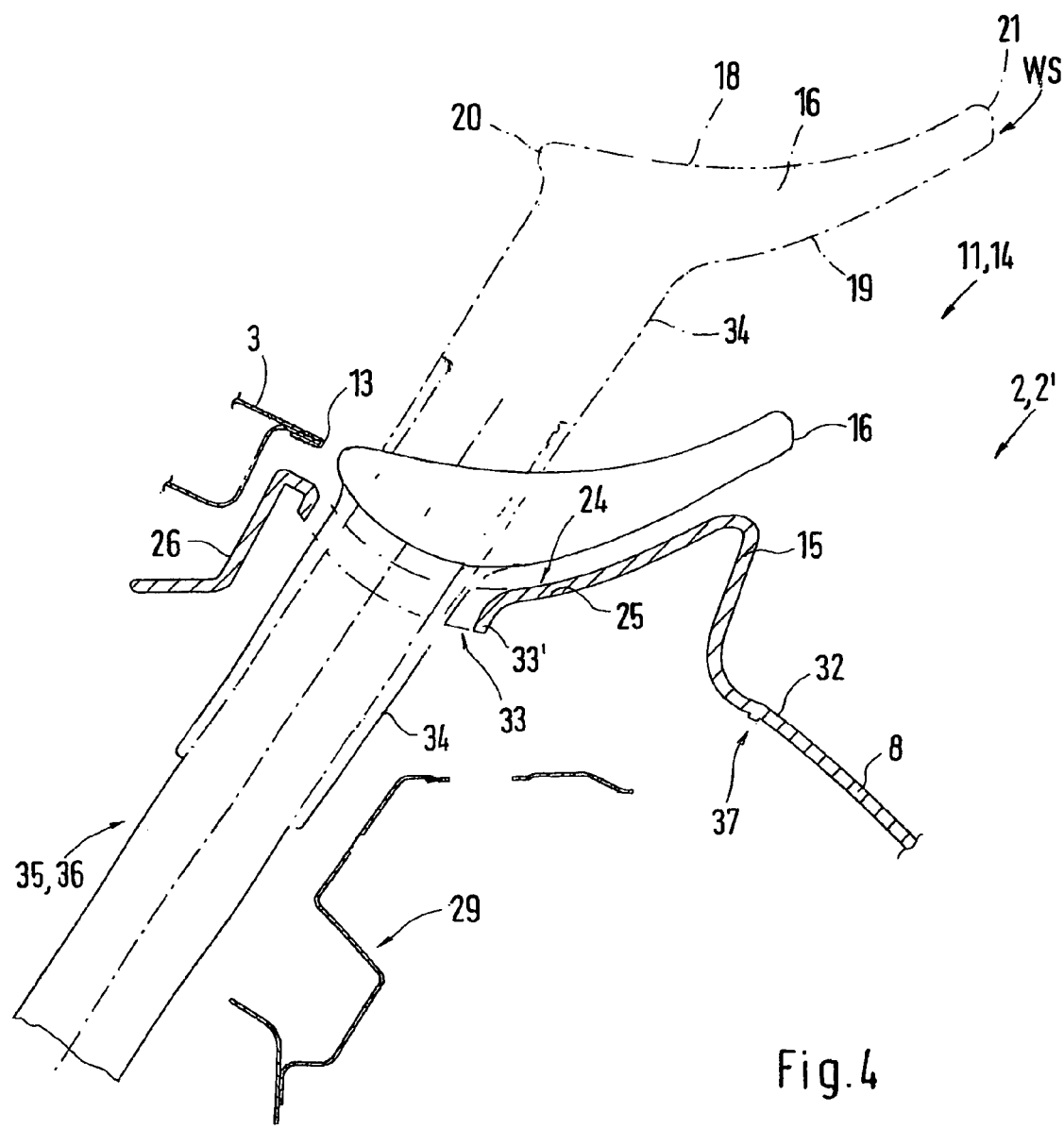
FIG. 4 shows a section taken along a line IV—IV in FIG. 2 through the air guide means and the lower rear-end panel.

In FIGS. 1 and 4 can be seen a rear-end portion 2 of a body 2' of the motor vehicle 1 is shown partially in a longitudinal section, i.e., with a plane of section parallel to the vehicle's longitudinal axis FL. The rear-end portion 2 comprises a trunk lid 3 which covers or uncovers a chamber 4 beneath it, especially a luggage compartment or an engine compartment. The rear-end portion 2 also has a lower rear-end panel 6 which has an upper marginal strip 7 running across the vehicle's width FB and approximately in the direction of the vehicle's longitudinal axis FL, and an apron 8 continuing downward approximately in the direction of the vehicle's upper axis FH, which can be equipped with a license plate mounting area 9 (FIG. 2). As shown in FIGS. 2 and 3, the lower rear-end panel 6 also has lateral cut-outs 10 alongside the marginal strip 7, into which tail lights (not shown) can be inserted. The marginal strip 7 thus extends between the two openings 10 for the tail lights. A rear-end air guiding means 11 is arranged on the marginal strip 7, and can assume a rest position RS and an active position WS drawn in dash-dotted lines in FIGS. 1 and 4. The air guiding means 11 extends across the vehicle's width FB and in the direction of the transverse axis FQ of the vehicle and is arranged behind—with reference to the direction of travel FR—the trunk lid 3, so that while the motor vehicle 1 is running in direction FR an air stream is established as indicated by arrow 12, which is referred to hereinafter as the air flow direction 12. In FIG. 1 it can be seen that the air guiding means 11 adjoins a transverse back edge 13 of the trunk lid 3, which extends in the transverse direction FQ of the vehicle, i.e., across the vehicle's width FB.

The air guiding means 11 is made in two parts as a slotted wing system 14 and thus has a fixed rear spoiler 15 extending across the vehicle's width FB, and a movable rear wing 16, which is disposed above the rear spoiler 15 and also extends across the vehicle's width FB with a wing-like profile 17 having a top side 18 and a bottom side 19, the bottom side 19 facing the rear spoiler 15. The top and bottom sides 18 and 19 of the wing-like profile 17 come together at a front edge 20 and at a rear edge 21 of the wing-like profile 17, the front edge 20 becoming adjacent to transverse edge 13 if the rear wing 16 is in its retracted rest position RS. When the rear wing 16 is in its extended active position WS, a gap 22 is formed between the bottom 19 of the wing-like profile 17 and the lower rear-end panel 6, and the air passes through it while the vehicle is running in the air flow direction 12. The aerodynamic action of a slotted wing system is disclosed in DE 197 41 321 A1, so it is not discussed here.

The marginal strip 7 of the rear-end panel 6 constitutes a continuation 23 directed forward, i.e., in the direction of travel FR, which includes on the one hand the fixed rear spoiler 15 as a raised portion and on the other hand extends in the form of a trough 24 to a point beneath the transverse edge 13 of the trunk lid 3. In the direction of travel FR, the trough 24 is ahead of the rear spoiler 15 and passes smoothly with its trough bottom 25 into the profile of the rear spoiler 15. The bottom 25 of the trough 24 is then underneath the transverse edge 13, so that the lower rear-end panel 16, when in its retracted rest position RS, is flush with regard to its height with the transverse edge 13, at least with its front edge 20. A prolongation 26 beginning from the trough 24 extends all the way to a gasket 27 which runs preferably around the trunk opening. The gasket 27 is placed on a flange 28 of a body frame 29 of the motor vehicle 1, and on this body frame 29 the lower rear-end panel 6 is also fastened and the marginal strip 7 is furthermore supported by a structure 30.

In FIG. 1 a line 31 is drawn in dashes between the transverse edge 13 of the trunk lid 3 and the apron 8, and as an imaginary continuation it reflects the course of the outer skin or its level between the transverse edge 13 and the apron 8. The trough 24 lies beneath line 31 and underneath the level of the external skin 32 and the transverse edge 13 of the trunk lid, at least in reference to line 31. In addition, line 31 defines the trough 24, and also it is apparent that the bottom 25 of the trough 24 merges smoothly with the rear spoiler to form a hump on the line 31. Accordingly, the trough 24 lies ahead of the intersection SP of line 31 with the bottom 25, and the rear-deck spoiler 15 is behind it. In the active position WS the rear wing 16 lies above line 31 and at a distance therefrom in the direction of the vehicle's vertical axis FH.

As seen in FIG. 2, the lower rear-end panel 6 is provided at each end of its marginal strip 7 with at least one opening 33 through which supports pass for the rear wing 16, in the form of columns 34, as can seen also in FIG. 4. These columns 34 are each connected to a raiser 35 which is a component of a drive means 36, not further represented, for the air guiding means 11, in order to raise the rear wing 16 from its retracted rest position RS into the active position WS indicated in dash-dotted lines in FIGS. 1 and 4, and vice versa, especially automatically, for example according to speed or in some cases also manually. The drive means 36 can be mounted on the body frame 29 and/or on the lower rear-end panel 6. The opening or openings 33 can be provided with a stopper or a projecting collar 33', especially an annular collar arranged on the inside 37 of the lower rear-end panel 6 and projecting inwardly, as well as one preferably integral with the lower rear-end panel 6 and improving the rigidity of the marginal strip 7 or of the trough 24.

The supporting structure 30 for the bottom 25 of the trough 24 shown in FIG. 1 is further explained with the aid of FIGS. 1 and 3. FIG. 1 shows a section along line I—I in FIG. 3, the rear wing 16 not being shown in FIG. 3. The supporting structure 30 is arranged below the bottom 25 of the trough and supports the latter against the body frame 29. Instead, the supporting structure 30 is arranged on the inside 37 of the lower rear-end panel 6 as seen in FIG. 3, the inside 37 being arranged opposite the outside, i.e., the outer skin 32.

The supporting structure 30 has the supporting shell 38 which follows the shape of the bottom 25 of the trough 24 on the inside 37. On this supporting shell 38 one or more boxes 39, 40, 41 projecting from it are arranged, especially of a kind made integral with the supporting shell 38; these supporting boxes support themselves on the body frame 29. The middle supporting box 40 has at its bottom end 42 a projection 43 which engages in a corresponding socket 44 on the body frame 29. This socket can be created in the form of an opening in a body frame projection 45 made as a flap or as a flange. Otherwise the two outer boxes 39 and 41 can thrust against a body frame projection 45 of this kind.

The supporting structure 30 can be made integral with the lower rear-end panel 6 or, in a preferred embodiment, as a separate part fastened to the lower rear-end panel 6 near the marginal strip 7, as will be discussed further on. At lease one hanging hook 46 extends out from the supporting shell 38 at the end, i.e., facing the prolongation 26, and engages a hanger loop 47 provided on the marginal strip 7, especially on the prolongation 26. Along the supporting shell 38 between the openings 33, one or more of these hanging hooks and hanger loops can be arranged. In the embodiment in FIG. 3, two hanger loops and hanging hooks 46 and 47 are provided on the supporting structure 30 and on the lower rear panel 6, respectively. Adjacent to the rear spoiler 15 an additional means for fastening the supporting structure 30 to the lower rear panel 6 is provided. For that purpose at least one hook 48 extends out from the inside 37 of the lower rear panel 6 and enters an eye 49 provided on the supporting structure 30. To prevent the eye from slipping away from the hook 48 a fastening means 50 is provided which in the illustrated embodiment is made in the form of a clamp 51 placed on the hook 48 and holds the supporting structure 30 on the inside 37. This clamp 51 can be a sheet-metal clamp, especially one made of spring steel. In the embodiment illustrated, three hooks 48 spaced apart from one another, matching eyes 49 and a fastener 50 are provided.

In an embodiment not shown here, it would be conceivable, instead of the above-described fastening of the supporting structure 30 to the marginal strip 7, to fasten the supporting structure to the inner side 37 near the marginal strip below the bottom 25 in a different way, for example by gluing and/or clipping. Since in a preferred embodiment the lower rear-end panel 6 is made in one piece with its apron 8, its marginal strip 7, the trough 24 and the rear spoiler 15, it would also be conceivable to make the supporting structure 30 integral with the lower rear-end panel 6, the latter being made as a plastic part, anyway.

What is claimed is:
1. A motor vehicle comprising,
a trunk lid having a rear transverse edge;

an air guide extending across the width of the vehicle, the air guide adjoining the rear transverse edge of the trunk lid, wherein the air guide includes a slotted wing system having a rear wing displaceable between a retracted rest position and a deployed active position and having a fixed rear-deck spoiler lying below the rear wing; and a lower rear end panel including a continuation that runs beneath the rear transverse edge of the trunk lid, wherein the continuation has a shallow trough which runs across the vehicle width and which at least partially accommodates the rear wing when the rear wing is in the rest position, and wherein the rear-deck spoiler has a hump disposed across the vehicle width on the lower rear end panel wherein the rear-deck spoiler adjoins smoothly the bottom of the trough and projects above the transverse edge of the trunk lid, and a section of the bottom of the trough under the transverse edge of the trunk lid.

2. The motor vehicle according to claim 1, further comprising a supporting structure for the bottom of the trough is disposed under the bottom of the trough.

3. The motor vehicle according to claim 2, wherein the supporting structure is disposed on the inside of the lower rear end panel.

4. The motor vehicle according to claim 3, wherein the supporting structure has a supporting shell which is adapted to the shape of the bottom of the trough.

5. The motor vehicle according to claim 4, wherein the supporting structure has at least one hanger hook which engages a hanger eye on the lower rear end panel.

6. The motor vehicle according to claim 5, wherein the supporting structure has at least one eye which is penetrated by a hook on the lower rear end panel, and wherein the hook has a fastener which holds the supporting structure on the inner side of the lower rear end panel.

7. The motor vehicle according to claim 6, wherein the fastener is made in the form of a clamp which can be placed on the hook.

8. The motor vehicle according to claim 7, wherein the supporting structure rests on a body frame of the motor vehicle.

9. The motor vehicle according to claim 8, wherein the supporting structure has at least one supporting box which engages the body frame of the motor vehicle.

10. The motor vehicle according to claim 9, wherein the supporting box has a projection which engages a matching receiver on the body frame.

11. The motor vehicle according to claim 10, wherein the lower rear end panel is made integrally as a plastic part together with the trough and the rear-deck spoiler.

12. The motor vehicle according to claim 11, wherein, into the lower rear end panel, at least one through-opening is created for a drive for the rear wing.

13. The motor vehicle according to claim 12, wherein the through-opening is provided with a collar.

14. The motor vehicle according to claim 1, wherein at least one portion of the trough lies underneath an imaginary prolongation of a body sheet of the motor vehicle.

15. The motor vehicle according to claim 1, wherein the rear-deck spoiler overlaps the transverse edge of the trunk lid.

16. The motor vehicle according to claim 1, further comprising a supporting structure for the bottom of the trough is disposed under the bottom of the trough.

17. The motor vehicle according to claim 16, wherein the supporting structure is disposed on the inside of the lower rear end panel.

18. The motor vehicle according to claim 16, wherein the supporting structure has a supporting shell which is adapted to the shape of the bottom of the trough.

19. The motor vehicle according to claim 16, wherein the supporting structure has at least one hanger hook which engages a hanger eye on the lower rear end panel.

20. The motor vehicle according to claim 16, wherein the supporting structure has at least one eye which is penetrated by a hook on the lower rear end panel, and wherein the hook has a fastener which holds the supporting structure on the inner side of the lower rear end panel.

21. The motor vehicle according to claim 20, wherein the fastener is made in the form of a clamp which can be placed on the hook.

22. The motor vehicle according to claim 16, wherein the supporting structure rests on a body frame of the motor vehicle.

23. The motor vehicle according to claim 21, wherein the supporting structure has at least one supporting box which engages the body frame of the motor vehicle.

24. The motor vehicle according to claim 23, wherein the supporting box has a projection which engages a matching receiver on the body frame.

25. The motor vehicle according to claim 1, wherein the lower rear end panel is made integrally as a plastic part together with the trough and the rear-deck spoiler.

26. The motor vehicle according to claim 1, wherein, into the lower rear end panel, at least one through-opening is created for a drive for the rear wing.

27. The motor vehicle according to claim 26, wherein the through-opening is provided with a collar.

* * * * *